United States Patent
Kitano et al.

(10) Patent No.: US 6,419,040 B2
(45) Date of Patent: Jul. 16, 2002

(54) DRIVING FORCE CONTROL SYSTEM FOR FOUR-WHEEL DRIVE VEHICLES

(75) Inventors: Kazuhiko Kitano; Toru Nakasako; Akihiro Yamamoto; Naoki Uchiyama; Mitsuaki Hirakawa; Satoshi Taguchi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/734,542

(22) Filed: Dec. 13, 2000

(30) Foreign Application Priority Data

Dec. 24, 1999 (JP) .......................................... 11-366934

(51) Int. Cl.[7] .......................................... B60K 17/356
(52) U.S. Cl. ..................... 180/243; 180/65.4; 701/69
(58) Field of Search ................................. 180/242, 243, 180/197, 65.2, 65.4; 701/69; 477/107

(56) References Cited

U.S. PATENT DOCUMENTS

| 5,466,199 A | * 11/1995 | Kobayashi et al. | ......... 477/107 |
| 5,628,378 A | * 5/1997 | Saito et al. | ................. 180/197 |
| 5,788,005 A | * 8/1998 | Arai | ........................... 180/65.2 |
| 5,984,034 A | * 11/1999 | Morisawa et al. | ......... 180/65.2 |
| 6,205,379 B1 | * 3/2001 | Morisawa et al. | ............ 701/22 |
| 6,208,929 B1 | * 3/2001 | Matsuno et al. | .............. 701/89 |
| 6,223,116 B1 | * 4/2001 | Kin et al. | ...................... 701/82 |

FOREIGN PATENT DOCUMENTS

| JP | A-5-8639 | 1/1993 |
| JP | A-6-225403 | 8/1994 |

* cited by examiner

Primary Examiner—Avraham Lerner
(74) Attorney, Agent, or Firm—Arent Fox Kintner Plotkin & Kahn (57) ABSTRACT

A four-wheel drive vehicle is provided in which the main driven wheels are driven by an engine via a torque converter and the auxiliary driven wheels are driven by an electric motor. The response of the vehicle to the operation of the accelerator is improved by suppressing in advance the slip of the main driven wheels due to an excess output of the engine. The main driven wheels are driven by an engine via a torque converter and auxiliary driven wheels are driven by an electric motor. The vehicle is started by the output of the electric motor in the region in which the speed ratio of the torque converter is small (that is to say, the region in which the efficiency is low) such as when the vehicle is starting, and when it enters the region in which the speed ratio of the torque converter exceeds 0.8 and the efficiency exceeds 85% the drive of the electric motor is stopped or suspended and the vehicle is made to travel by means of the output of the engine.

5 Claims, 6 Drawing Sheets

DRIVING FORCE CONTROL SYSTEM FOR FOUR-WHEEL DRIVE VEHICLES

BACKGROUND OF THE INVENTION

1. Field of the Invention

The present invention relates to a driving force control system for four-wheel drive vehicles comprising main driven wheels which are driven by an engine via a torque converter and auxiliary driven wheels which are driven by an electric motor independently from the engine.

2. Description of the Prior Art

Hybrid type four-wheel drive vehicles in which a pair of front or rear main driven wheels are driven by an engine and another pair of front or rear auxiliary driven wheels are driven by an electric motor which is connected to a battery are known in, for example, Japanese Patent Application Laid-open No. 5-8639 and Japanese Patent Application Laid-open No. 6-225403. Such four-wheel drive vehicles attempt to economize on fuel consumption and improve the ground covering properties on poor condition roads by switching over between a two-wheel drive state in which the vehicle travels using the engine alone and a four-wheel drive state in which the vehicle travels using the engine and the electric motor on the basis of a switch-over pattern which is predetermined using the engine load and the vehicle speed as parameters.

In the case of front-wheel drive vehicles in which the engine is mounted on the front section, since the percentage torque amplification is large in the region in which the speed ratio of the torque converter is small, such as when starting to travel. The front wheels, which are the main driven wheels, easily slip on slippery road surfaces such as roads with snow. It is therefore possible to suppress in advance the slip of the front wheels by distributing the driving force to the rear wheels which are auxiliary driven wheels. Moreover, the response of the vehicle to depression of the accelerator pedal can be enhanced by applying assistance from an electric motor in the region in which the speed ratio of the torque converter, which employs the transmission of a fluid, is small. The efficiency η of the torque converter is a function of the speed ratio e (output rotational rate / input rotational rate). The efficiency η is low in the region where the speed ratio e is small such as when the vehicle is starting to travel, and the efficiency η is high in the region where the speed ratio e is large such as when the vehicle is cruising. Therefore, if the engine is assisted by accurately operating the electric motor in the region where the speed ratio e of the torque converter is small such as when the vehicle is starting, it can contribute to economizing the fuel consumption of the engine.

SUMMARY OF THE INVENTION

The present invention has been made in view of the above-mentioned circumstances and, with regard to a four-wheel drive vehicle whose main driven wheels are driven by an engine via a torque converter and whose auxiliary driven wheels are driven by an electric motor. It is an objective of the present invention to improve the response of the vehicle to the operation of the accelerator by suppressing the slip of the main driven wheels when starting to travel, etc.

In order to achieve this object, a driving force control system for a four-wheel drive vehicle is provided which comprises main driven wheels driven by an engine via a torque converter, speed ratio detecting means for detecting the speed ratio of the torque converter and auxiliary driven wheels driven by an electric motor independently from the engine. A control means controls the distribution ratio of the output generated by the engine and the output generated by the electric motor according to the speed ratio of the torque converter.

Since the output generated by the engine and the output generated by the electric motor are distributed according to the speed ratio of the torque converter, by reducing the output of the engine for driving the main driven wheels and increasing the output of the electric motor for driving the auxiliary driven wheels in the region in which the speed ratio of the torque converter is low and the percentage torque amplification is high when the vehicle is starting, the driving force can be distributed among the four wheels so as to suppress the slip of the main driven wheels and improve the response of the vehicle to the operation of the accelerator. By assisting the output of the engine by means of the output of the electric motor so as to compensate for the reduction in the torque converter efficiency η in the region in which the speed ratio is low, it can be anticipated that the effect will be to reduce the fuel consumption.

Furthermore, a driving force control system for a four-wheel drive vehicle is proposed wherein the speed ratio of the torque converter at which the drive of the electric motor is suspended, different from the speed ratio of the torque converter at which the drive of the electric motor is started.

Since the speed ratio at which the drive of the electric motor is suspended is made different from the speed ratio at which the drive of the electric motor is started, it is possible to prevent frequent switch-over between driving and stopping or suspending the drive of the electric motor when the speed ratio changes slightly.

Still further, a driving force control system for a four-wheel drive vehicle is proposed wherein the maximum output of the electric motor changes according to the state of slip of the main driven wheels.

Since the maximum output of the electric motor is changed according to the state of slip of the main driven wheels, it is possible to effectively suppress the slip of the main driven wheels on a road surface having a low coefficient of friction when the vehicle is starting, etc. thereby enhancing the ground covering properties.

BRIEF DESCRIPTION OF THE DRAWINGS

FIG. 1 to FIG. 6 illustrate an embodiment of the present invention.

DETAILED DESCRIPTION OF THE PREFERRED EMBODIMENT

Figure 1:
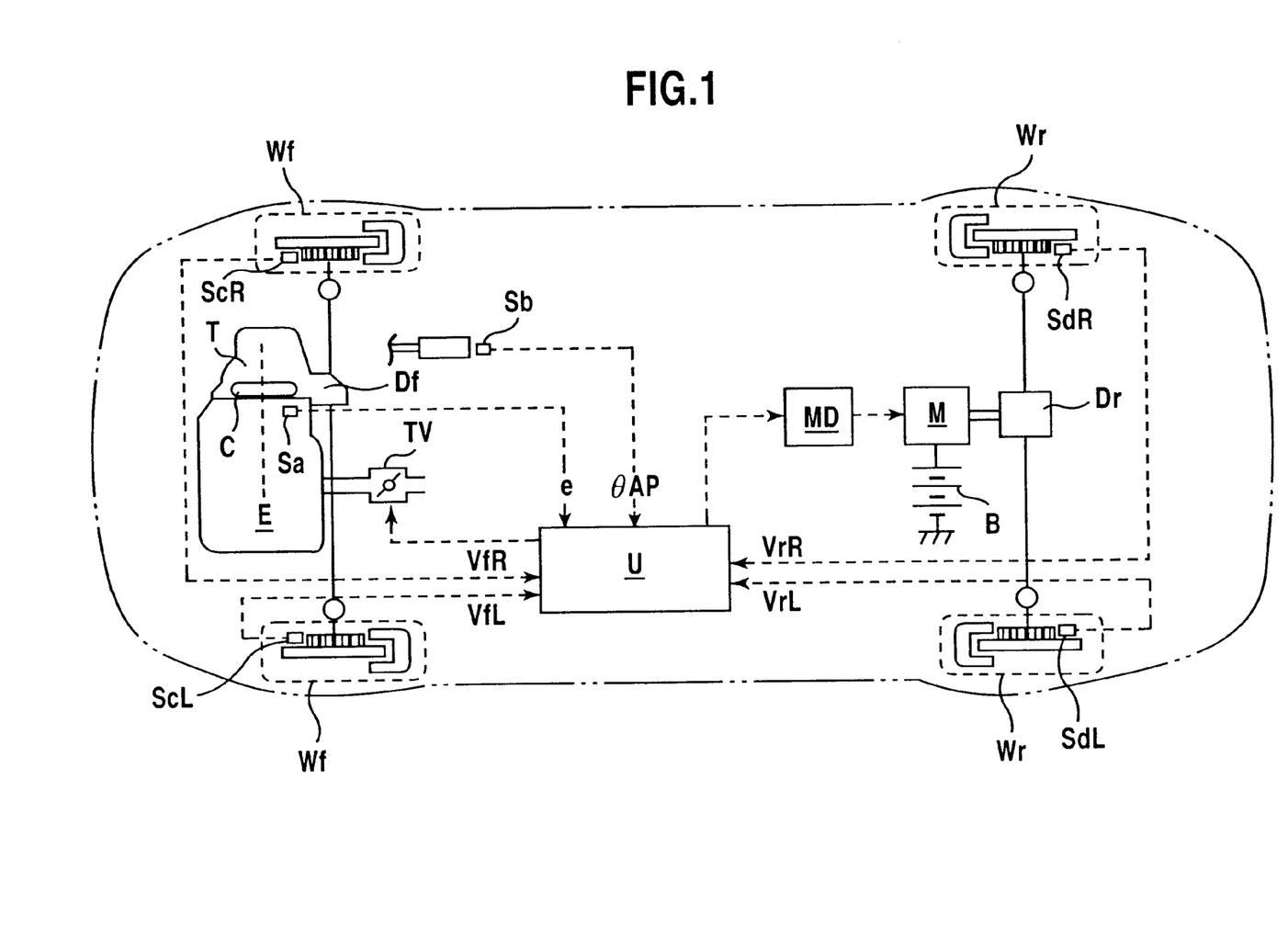
FIG. 1 is a diagram showing the entire structure of a hybrid four-wheel drive vehicle.

FIG. 1 shows a hybrid four-wheel drive vehicle which comprises right and left main driven wheels Wf, Wf (front wheels) which are driven by an engine E via a transmission T and a front differential gear Df, and right and left auxiliary driven wheels Wr, Wr (rear wheels) which are driven by an electric motor M connected to a battery B via a rear differential gear Dr.

A known torque converter C is provided between the crankshaft of the engine E and the main shaft of the transmission T, and the speed ratio e (output rotational rate/input rotational rate) of the torque converter C is detected by a torque converter speed ratio detecting means Sa. The degree of opening θAP of an accelerator which is operated by the driver is detected by an accelerator degree of opening detecting means Sb. Right and left main driven wheel speeds VfR, VfL are detected by main driven wheel speed detecting means ScR, ScL, and right and left auxiliary driven wheel speeds VrR, VrL are detected by auxiliary driven wheel speed detecting means SdR, SdL.

The speed ratio e of the torque converter C, degree of opening θAP of the accelerator, main driven wheel speeds VfR, VfL and auxiliary driven wheel speeds VrR, VrL are input into an electronic control unit U which forms the control means of the present invention. An electronic control unit U controls the output of the engine E via a throttle valve TV as well as the output of the electric motor M via a motor driver MD.

Figure 2:
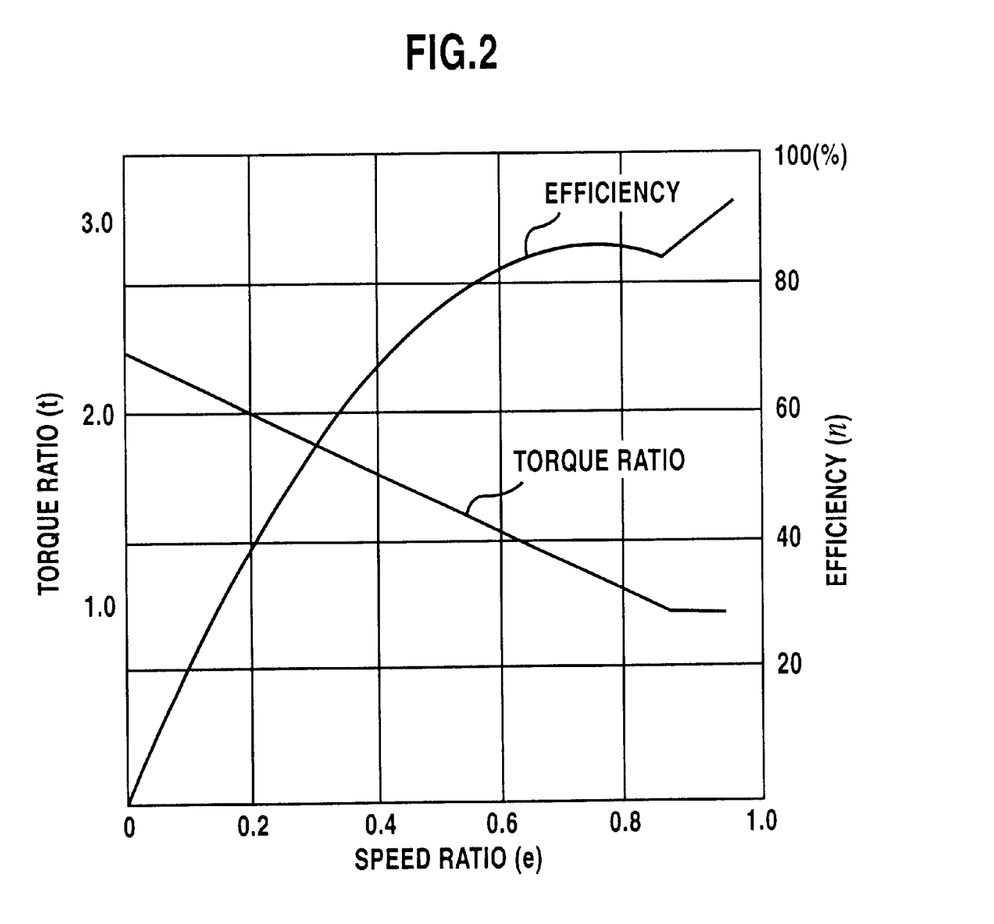
FIG. 2 is a graph showing the characteristics of a torque converter.

FIG. 2 shows the characteristics of the standard torque converter C. The abscissa denotes the speed ratio e (output rotational rate / input rotational rate) and the ordinate denotes the efficiency η and the torque ratio t. As is clear from the figure, the efficiency η increases up to a maximum value of 85% in the region of the converter in which the speed ratio e is in the range from 0.0 to 0.8. The torque ratio t linearly decreases from 2.2 to 1.0 in the region of the converter in which the speed ratio e is in the range from 0.0 to 0.8, and it is maintained at a constant value of 1.0 in a coupling region in which the speed ratio e exceeds 0.8.

When the vehicle starts to travel the engine E drives the main driven wheels Wf, Wf and the speed ratio e of the torque converter C gradually increases from 0.0, but in the region of the converter prior to the coupling region in which the speed ratio e exceeds 0.8, the torque ratio is 1.0 or more so that a torque amplification effect is exhibited. By reducing the output of the engine E during this period and driving the auxiliary driven wheels Wr, Wr by means of the electric motor M so as to assist the reduction, the vehicle is put in a four-wheel drive state so as to enhance the starting performance on road surfaces having a low coefficient of friction, while effectively preventing the main driven wheels Wf, Wf from slipping. In particular, since the electric motor M can drive the auxiliary driven wheels Wr, Wr without any of the time delay that is an intrinsic characteristic of a fluid transmission, the starting response of the vehicle can be enhanced.

In addition, since the efficiency η of the torque converter C is as low as 85% or less in the coupling region in which the speed ratio e is 0.8 or below, by driving the auxiliary driven wheels Wr, Wr by means of the electric motor M in this region to assist the engine E, the load applied to the engine E can be lightened in the region in which the efficiency η of the torque converter C is low, and thus it is anticipated that the effect will be to suppress an increase in the fuel consumption.

Next, details of the control of the engine E and the electric motor M are explained by reference to the flow charts shown in FIG. 3 to FIG. 6.

Figure 3:
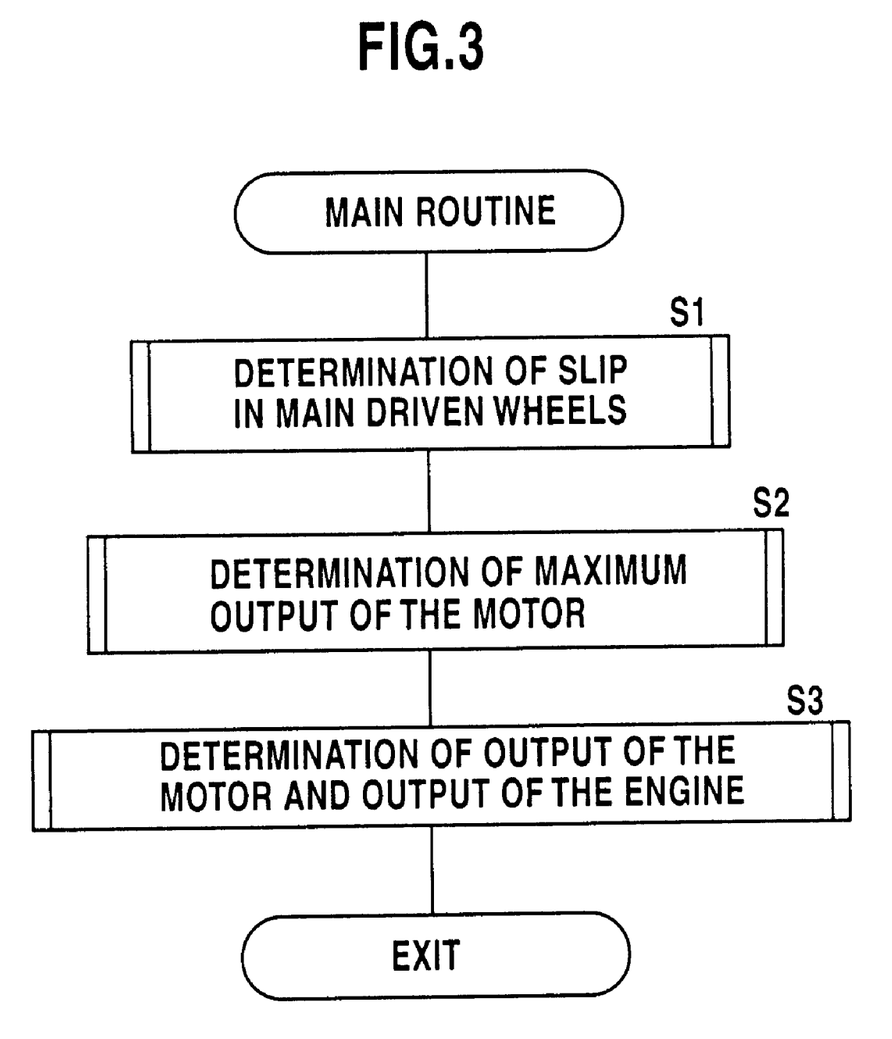
FIG. 3 is a flow chart of the main routine.

In Step S1 of the main routine shown in FIG. 3, a determination is made as to whether or not the main driven wheels Wf, Wf (front wheels) which are driven by the engine E, are slipping. In the case where the main driven wheels Wf, Wf have slipped, in order to increase the ground covering properties rather than economize on fuel consumption, the auxiliary driven wheels Wr, Wr are driven by the electric motor M to put the vehicle in a four-wheel drive state.

In the subsequent Step S2, the maximum output of the electric motor M is determined. The maximum output of the electric motor M may be set at three levels of 4 kW, 8 kW and 12 kW. The maximum output of the electric motor M is set at the lowest level of 4 kW in a state in which the main driven wheels Wf, Wf are not slipping, the maximum output of the electric motor M is set at the middle level of 8 kW in a state in which the main driven wheels Wf, Wf are slipping and the degree of opening θAP of the accelerator is comparatively low, and the maximum output of the electric motor M is set at the highest level of 12 kW in a state in which the main driven wheels Wf, Wf are slipping to a great extent and the degree of opening θAP of the accelerator is comparatively high. Since the maximum output of the electric motor M is thus changed according to the state of slip of the main driven wheels Wf, Wf, it is possible to effectively suppress the slip of the main driven wheels Wf, Wf according to the coefficient of friction of the road surface, etc. thus enhancing the ground covering properties.

In the subsequent Step S3, the output of the electric motor M and the output of the engine. E are determined in relation to each other to obtain a total output which is determined by the degree of opening θAP of the accelerator.

Next, the subroutine of Step S1 is explained by reference to the flow chart shown in FIG. 4.

First of all, the difference between the front and rear wheel speeds is calculated by subtracting the auxiliary driven wheel speeds VfR, VrL which are detected by the auxiliary driven wheel speed detecting means SdR, SdL from the main driven wheel speeds VfR, VfL which are detected by the main driven wheel speed detecting means ScR, ScL. In Step S12 if there was no slip of the main driven wheels Wf, Wf during the previous cycle, the routine moves on to Step S13, and in Step S13 (1) if the wheel speed difference exceeds a predetermined wheel speed difference 1; or (2) if the speed ratio e of the torque converter C is at a predetermined speed ratio or below and the rate of change of the speed ratio e exceeds a predetermined rate of change of the speed ratio, it is determined in Step S14 that the main driven wheels Wf, Wf are slipping.

On the other hand, in Step S12 if the main driven wheels Wf, Wf had slipped during the previous cycle, the routine moves on to Step S15, and in Step S15 (1) if the required engine output is less than the engine output limit value or (2) if the wheel speed difference is less than a predetermined wheel speed difference 2, it is determined in Step S16 that the main driven wheels Wf, Wf are not slipping.

Figure 4:
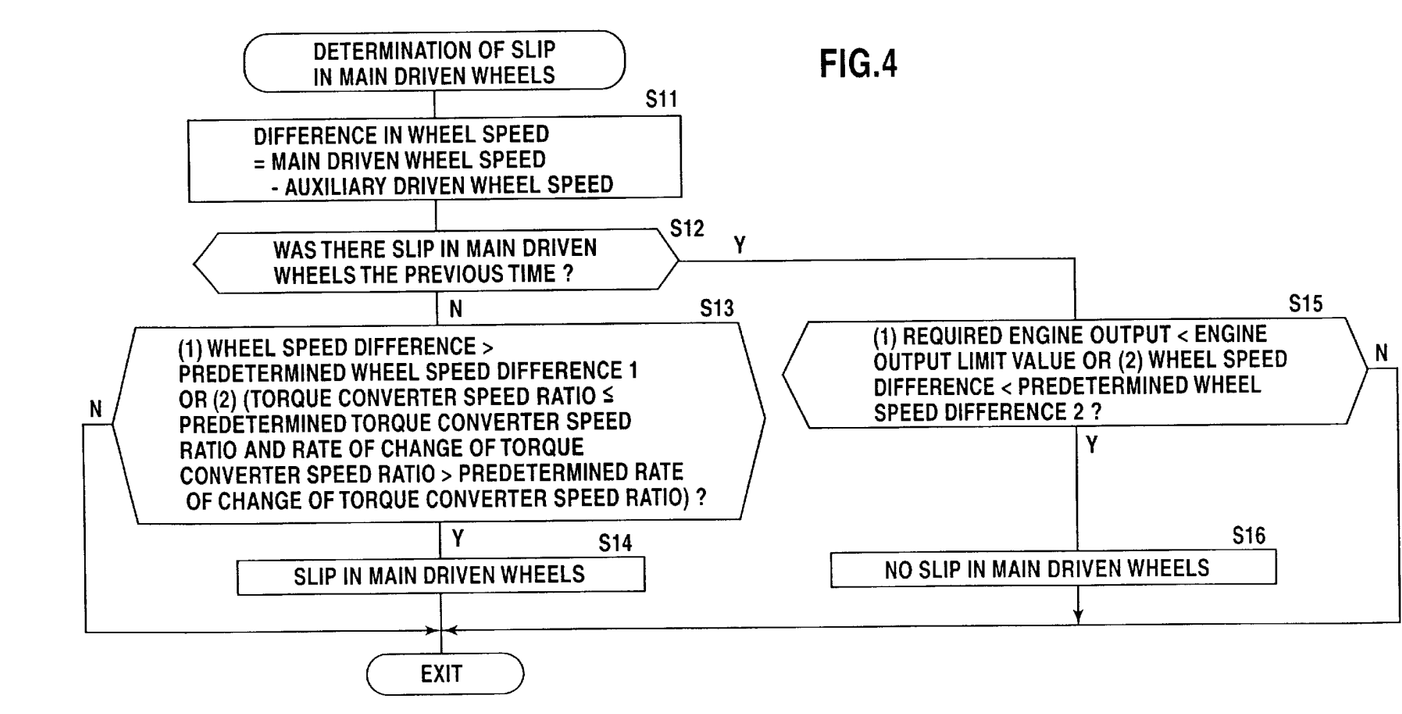
FIG. 4 is a flow chart showing a routine for determining the possibility of slip in the main driven wheels.
Figure 5:
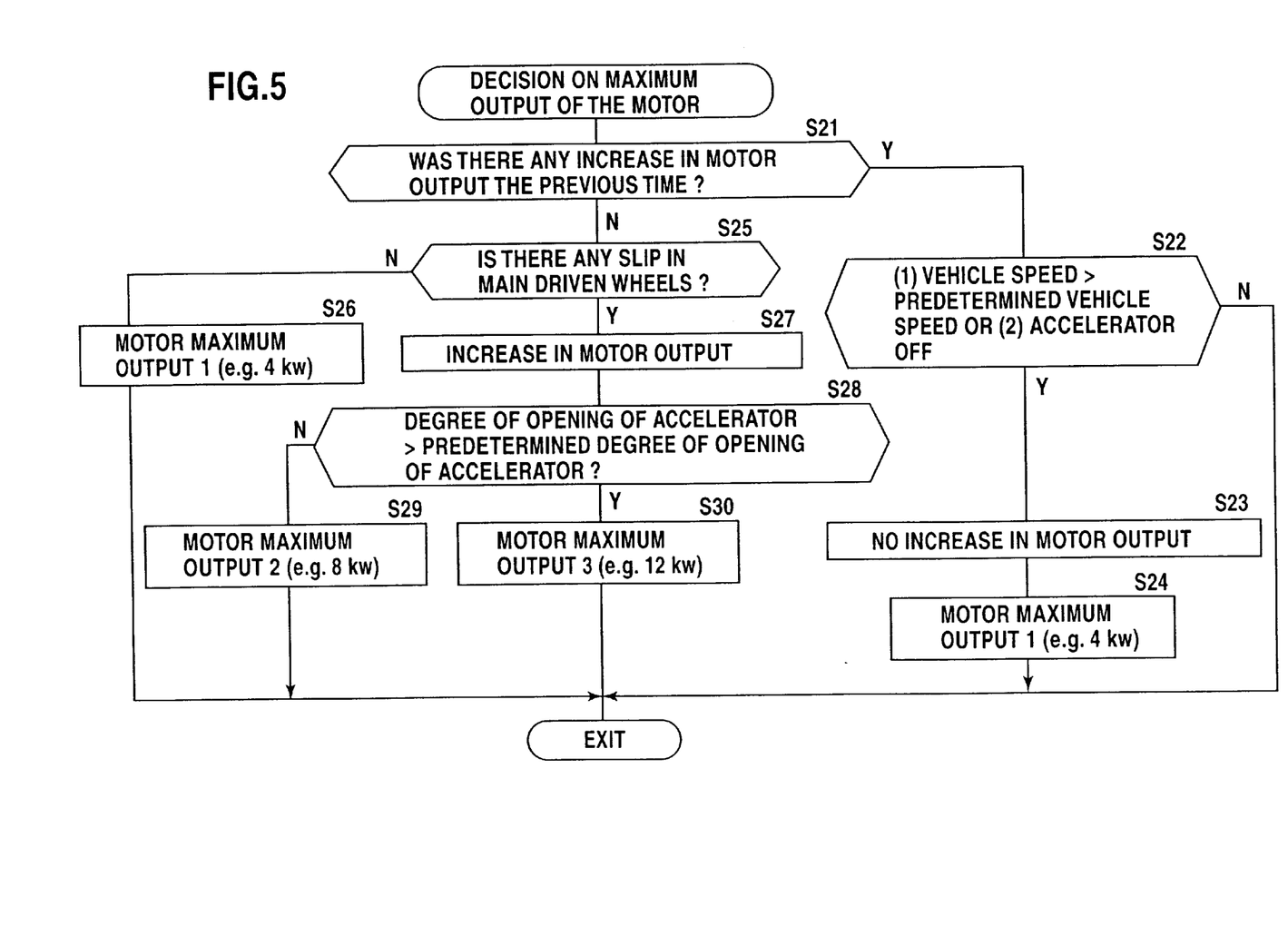
FIG. 5 is a flow chart of a routine for determining the maximum output of an electric motor.

As hereinbefore described, when a determination is made using the flow chart shown in FIG. 4 as to whether or not the main driven wheels Wf, Wf are slipping, the routine moves on to the flow chart shown in FIG. 5.

First of all, in Step S21 if there was an increase in the output of the electric motor M during the previous cycle, the routine moves on to Step S22, and in Step S22 if (1) the vehicle speed exceeds a predetermined vehicle speed or (2) the accelerator is 'OFF', the output of the electric motor M is not increased in Step S23 and the maximum output of the electric motor M is set at the lowest level '1' (4 kW) in Step S24. This is because there is no need to strongly assist the engine by means of the electric motor M after the vehicle has started and is in a cruising state or when the vehicle is decelerating.

In Step S21 if there was no increase in the output of the electric motor M during the previous cycle, the routine moves on to Step S25, and if the main driven wheels Wf, Wf are not slipping, the maximum output of the electric motor M is set at the lowest level '1' (4 kW) in Step S26. This is because in the case in which the main driven wheels Wf, Wf are not slipping there is no need to drive the auxiliary driven wheels Wr, Wr strongly to enhance the starting performance on a road surface having a low coefficient of friction.

In the Step S25 if the main driven wheels Wf, Wf are slipping, the routine moves on to Step S27 and the output of the electric motor M is increased, in the subsequent Step S28 the degree of opening θAP of the accelerator which is detected by the accelerator degree of opening detecting means Sb, is compared with a predetermined degree of opening of the accelerator and if the degree of opening θAP of the accelerator is not higher than the predetermined degree of opening of the accelerator, it is determined that the degree to which the main driven wheels Wf, Wf are slipping is small, and in Step S29 the maximum output of the electric motor M is set at the middle level '2' (8 kW) in order to eliminate the slip of the main driven wheels Wf, Wf. If the degree of opening θAP of the accelerator exceeds the predetermined degree of opening of the accelerator in Step S28 it is determined that the degree to which the main driven wheels Wf, Wf are slipping, is large, and the maximum output of the electric motor M is set at the highest level '3' (12 kW) in Step S30 in order to promptly eliminate the slip of the main driven wheels Wf, Wf.

Figure 6:
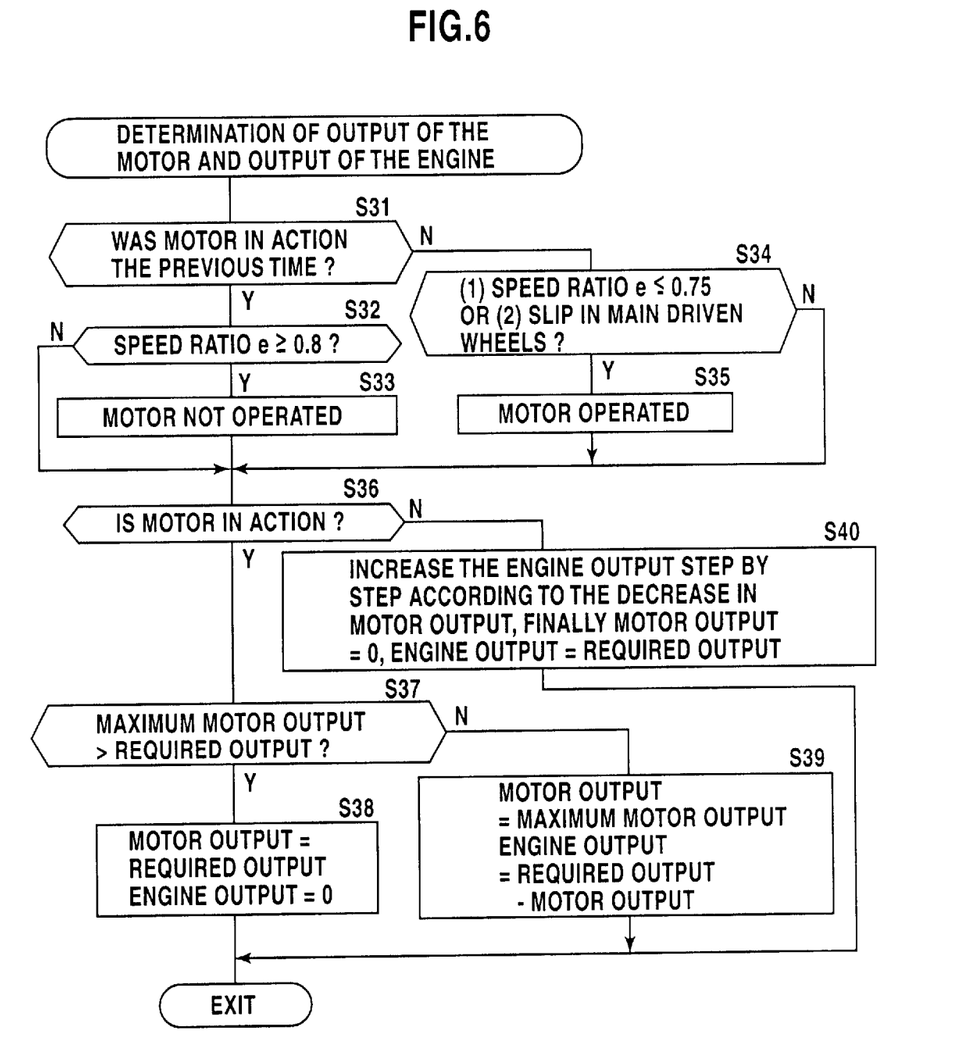
FIG. 6 is a flow chart of a routine for determining the output of the electric motor and the output of an engine.

As hereinbefore described, when the maximum output of the electric motor M for driving the auxiliary driven wheels Wr, Wr is determined using the flow chart shown in FIG. 5, the routine moves on to the flow chart shown in FIG. 6.

First of all, in Step S31 if the electric motor M was in action during the previous cycle, the routine moves on to Step S32 and in Step S32 the speed ratio e of the torque converter C which is detected by the torque converter speed ratio detecting means Sa, is compared with a predetermined first threshold of 0.8. If the speed ratio e is 0.8 or more it is determined that the efficiency η of the torque converter C is in a high region of 85% or more, and in Step S33 the operation of the electric motor M is stopped, as to suspend the assistance from the electric motor M. On the other hand, in Step S31 if the electric motor M was suspended, in Step S34 the speed ratio e of the torque converter C is compared with a predetermined second threshold of 0.75. If the speed ratio e is 0.75 or below, it is determined that the efficiency η of the torque converter C is in a low region of less than 85%, and it is determined that it is necessary to assist the output of the engine E by driving the auxiliary driven wheels Wr, Wr, and in Step S35 the electric motor M is operated to assist the engine E by means of the electric motor M.

Since a hysteresis is thus introduced so that the assistance from the electric motor M is suspended when the speed ratio e of the torque converter C becomes 0.8 or more and the assistance from the electric motor M is started when the speed ratio becomes 0.75 or less, it is possible to prevent frequent switch-over between driving and suspending the drive of the electric motor M.

In the subsequent Step S36 if the electric motor is operating and moreover in Step S37 if the maximum output of the electric motor M exceeds the required output, in Step S38 the output of the electric motor M is reduced to the required output and the output of the engine E is made zero so the required output is met by means of the output of the electric motor M alone. On the other hand, in the Step S37 if the maximum output of the electric motor M is not higher than the required output, in Step S39 the output of the electric motor M is set at its maximum output and the shortfall is provided from the output of the engine E. In the Step S36 if the electric motor M is suspended in Step S40, the output of the engine E is increased step by step in accordance with the decrease in the output of the electric motor M so that the output of the engine E coincides with the required output when the output of the electric motor M becomes zero.

In addition, since the load applied to the engine E increases while the vehicle is ascending, in Step S34 of the flow chart shown in FIG. 6 the speed ratio e of the torque converter C becomes 0.75 or less or the main driven wheels Wf, Wf slip and, as a result, the electric motor M is operated in Step S35 and the output of the engine E can be assisted.

As hereinbefore described, since the output of the engine E for driving the main driven wheels Wf, Wf is reduced and the output of the electric motor M for driving the auxiliary driven wheels Wr, Wr is increased in the region in which the speed ratio e of the torque converter C is low and the percentage of torque amplification is high when the vehicle is starting, the driving force is distributed among the front right, front left, rear right and rear left wheels to suppress the slip of the main driven wheels Wf, Wf and the response of the vehicle to the operation of the accelerator can be improved by driving the auxiliary driven wheels Wr, Wr by means of the electric motor M which does not have the time delay that is an intrinsic characteristic of a fluid transmission.

Although the output of the engine E is made zero in Step S38 of the flow chart shown in FIG. 6, it is desirable for the main driven wheels Wf, Wf to have a some degree of output on roads having a low coefficient of friction. Therefore, it is possible to set the output of the engine E so as to be about 0.3 times the required output instead of zero in Step S38.

As hereinbefore described, since the output generated by the engine and the output generated by the electric motor are distributed according to the speed ratio of the torque converter, by reducing the output of the engine for driving the main driven wheels and increasing the output of the electric motor for driving the auxiliary driven wheels in the region in which the speed ratio of the torque converter is low and the torque amplification efficiency is high when the vehicle is starting, the driving force can be distributed among the four wheels to suppress the slip of the main driven wheels and improve the response of the vehicle to the operation of the accelerator. Above all, by assisting the output of the engine by means of the output of the electric motor to compensate for the reduction in the torque converter efficiency η in the region in which the speed ratio is low, it can be anticipated that the effect will be to reduce the fuel consumption.

Since the speed ratio at which the drive of the electric motor is suspended, is made different from the speed ratio at which the drive of the electric motor is started, it is possible to prevent frequent switch-over between driving and suspending the drive of the electric motor when the speed ratio changes slightly.

Further, since the maximum output of the electric motor is changed according to the state of slip of the main driven wheels, it is possible to effectively suppress the slip of the main driven wheels on a road surface having a low coefficient of friction when the vehicle is starting, etc. thus enhancing the ground covering properties.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A driving force control system for a four-wheel drive vehicle comprising main driven wheels driven by an engine via a torque converter, speed ratio detecting means for detecting the speed ratio of said torque converter and auxiliary driven wheels driven by an electric motor independently from the engine, the control system comprising a control means coupled to said speed ratio detecting means for controlling the distribution ratio of the output generated by the engine and the output generated by the electric motor according to the speed ratio of said torque converter.

2. A driving force control system for a four-wheel drive vehicle according to claim 1, wherein the speed ratio of said torque converter at which the drive of the electric motor is stopped is different from the speed ratio of said torque converter at which the drive of the electric motor is started.

3. A driving force control system for a four-wheel drive vehicle according to claim 1, wherein main driven wheel speed detecting means and auxiliary driven speed detecting means are coupled to said control means and wherein said control means determines the state of slip of said main driven wheels and said control means changes the maximum output of said electric motor according to the state of slip of said main driven wheels.

4. A driving force control system for a four-wheel drive vehicle according to claim 1, wherein said electric vehicle is driven in a region in which the speed ratio of the torque converter is low when the vehicle is starting and, in accordance with an increase in said speed ratio of the torque converter, the drive of the electric motor is stopped.

5. A driving force control system for a four-wheel drive vehicle according to claim 4, wherein the drive of the engine is stopped and said electric vehicle is driven in said region in which the speed ratio of the torque converter is low when the vehicle is starting and, in accordance with an increase in said speed ratio of the torque converter, the drive of the electric motor is stopped and the engine is driven.

* * * * *